April 5, 1932. A. KRIEG 1,852,314
HARVESTER FOR CORN AND THE LIKE
Filed Feb. 4, 1927 5 Sheets-Sheet 1

Fig. 3

Patented Apr. 5, 1932

1,852,314

UNITED STATES PATENT OFFICE

ALFRED KRIEG, OF BATTLE CREEK, MICHIGAN, ASSIGNOR, BY MESNE ASSIGNMENTS, TO OLIVER FARM EQUIPMENT COMPANY, OF WILMINGTON, DELAWARE, A CORPORATION OF DELAWARE

HARVESTER FOR CORN AND THE LIKE

Application filed February 4, 1927. Serial No. 165,804.

The present invention relates to agricultural machines or the like of the harvester type and adapted for picking, husking and collecting corn and similar grain.

Among the objects of the invention is to provide novel means for detachably connecting a corn harvester to a tractor so as to be able to travel therewith, such means, in a specific embodiment, being in the form of a frame fitting about the tractor and connected to it as at the forward end thereof and having points of support, such as on the axle housings of the tractor, and supporting the harvester or picking mechanism at the side of the tractor, and preferably having the husking means at the rear and collecting means at the opposite side of the tractor.

Another object is the provision of novel driving means or power take-off means for the harvesting mechanism, preferably operated or driven by the operating means on the tractor and also preferably extending laterally and leading directly from the side of the tractor and to the picking mechanism of the harvesting means. Owing to the picking mechanism having a certain amount of vertical movement, it is also an object of the invention to make the drive or power take-off flexible in accommodation of such movements of the picking mechanism without in any way affecting the driving efficiency of the driving means.

A further object of the invention is the provision of means for pivotally supporting or hinging the picking mechanism at the rear of the agricultural device, such as to a transverse member of the frame at the rear end thereof and rearwardly beyond the rear end of the tractor. In this way the relative movement of the upper or discharge end of the picker and the receiving end of the husker located on the frame, will be reduced to a minimum, thus avoiding the disadvantages present in devices where the picking mechanism was pivoted intermediate its ends and whereby there was considerable relative movement or play between the discharge end of the picker and the receiving end of the husker. The novel structure of this invention also eliminates the means previously necessary to accommodate or compensate for such previously wide relative movements of the picker and husker.

The invention also comprehends novel means for substantially supporting or counterbalancing the forward end of the picking mechanism with means for raising or lowering the same as desired, and in which latter condition the front end of the picker means is maintained at a given height above the ground.

Another feature of the invention is the provision of a novel and simple drive in the picking means, having means driven by the power take-off and adapted to extend, as in the form of branch drives, to the husking means, and to the picking means, such as the snapping rolls, gathering chains and conveyor thereof.

Also, the invention may comprehend means for receiving kernels of corn that may have become detached and be included in with the removed husks, and for collecting such kernels with the husked ears. In this way these kernels are economized or reclaimed and are not discarded or discharged with the husks. The husk receiving means preferably cooperates with the kernel receiving means for feeding the received kernels to and into a collecting receptacle adapted to receive the husked ears.

The invention also includes the idea of providing novel means for receiving or collecting the husked corn while the tractor and harvester are traveling together. In one embodiment illustrating the invention, this is by way of means attached to the frame surrounding the tractor, and extending laterally, preferably on the side of the tractor opposite from that where the picker is located, for the adjustable connected of a grain wagon or cart so that the latter may travel along with and at the side of the tractor, and be so relatively located that the husked corn and loose kernels may be continuously fed into such wagon or cart. When the latter is filled, it may be detached and another connected in its place.

As another embodiment, a collecting receptacle in the form of a tank or bin or the like may be rigidly mounted or supported on the frame which surrounds the tractor, and preferably on the side opposite that where the picking mechanism is located. This bin is preferably elevated and preferably has an inclined bottom and control means for the discharge of the grain into a wagon or cart which may be drawn up to the side of the tractor at intervals as desired. The conveying means for receiving the husked grain from the husking mechanism as well as the loose kernels reclaimed from the reclaiming means, is preferably adapted to feed and discharge into this bin continuously.

The invention comprehends other objects, capabilities, advantages and features as will later appear and are inherently possessed thereby.

Referring now to the drawings.

And, Fig. 7 is a front view in elevation of the structure shown in Fig. 6.

Referring now more in detail to the drawings, the invention is shown associated with a tractor of any suitable construction and having a body 1 supported at its forward end upon an axle 2 and wheels 3 and 4, and connected at its rear end to a differential housing 5 having rigid axle housings 6 and 7, the tractor being surrounded as a whole by a frame having frame members 8 and 9 located at the sides of the tractor. The forward ends 10 and 11 of the frame members 8 and 9, fit into saddle sockets or the like in saddle pieces 12 and 13 disposed vertically and clamped against the channel pieces 14 and 15 at the sides of the radiator structure 16 of the tractor. In order to hold the forward ends 11 and 12 of the side members 8 and 9 rigidly in place, the forward ends 10 and 11 are connected by a cross rod 17 which may act as a tie rod or the like.

The side members 8 and 9 of the frame extend rearwardly along the sides of the tractor and intermediate their ends are secured saddle pieces 18 in any suitable manner, these saddle pieces being adapted to fit and rest upon the axle housings 6 and 7 and be held rigid therewith by means of U-shaped bolts or the like 19 passing underneath the housings 6 and 7 and being rigidly connected to the saddle members 18, in any suitable manner. In this way the axle housings offer points of support for the frame. The frame, however, is not pivoted about the axle housings.

The side member 8 extends rearwardly beyond the rear end of the tractor and is connected at its rear end 20 with a transverse member 21 which extends laterally beyond the side of the tractor carrying the frame member 9 for a purpose hereinafter more fully disclosed. The frame member 9 extends rearwardly beyond the axle housing of the tractor and has secured to it a frame segment or piece 22 preferably to the lower side of the member 9 so as to drop the member 22 for the purpose of clearing the mechanism, which will appear later. The rear end of the member 22 extends rearwardly beyond the tractor and has attached to the top of its rear end 23 a segment 24 which in turn is secured to the transverse member 21. It will be observed that the transverse member 21 has a portion 25 extending laterally beyond the member 9 and to one side of the tractor. This extending portion 25 constitutes a supporting member for the rear end of the picking mechanism.

Figure 1:
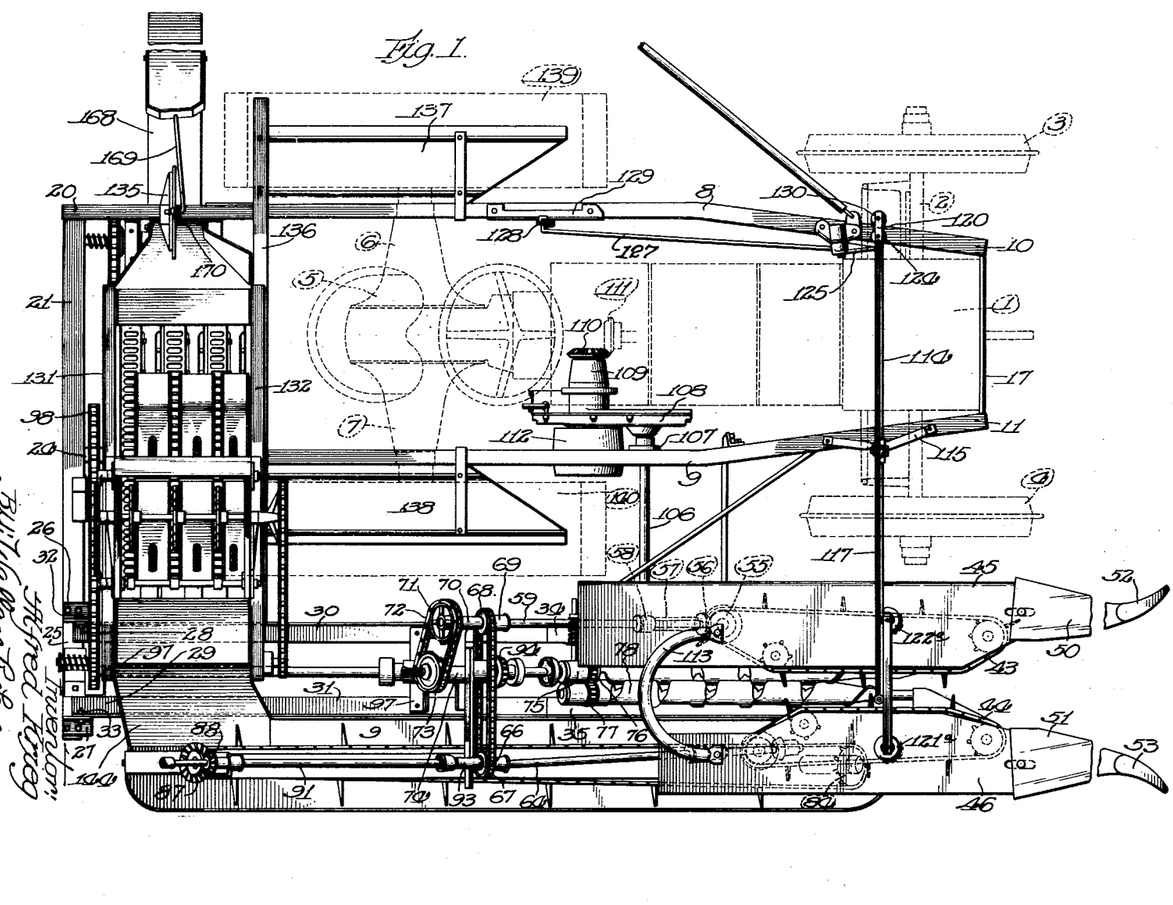
Fig. 1 is a top plan view of a harvesting device constructed in accordance with the invention and shown connected to a tractor, the latter being shown in dotted lines.

In order that the picking mechanism may be supported pivotally or hinged at its rearmost end, the extended portion 25 of the transverse member 21 has secured to the top thereof angle members 26 and 27 to the vertical flanges of which are pivotally connected the rear ends 28 and 29 of frame or supporting members 30 and 31 extending forwardly and acting as the supporting elements for the picking mechanism. The rear ends 28 and 29 are pivotally connected to the vertical flanges of the members 26 and 27 by way of pivot bolts or the like 32 and 33 clearly shown in Fig. 1 of the drawings. In this way the corn picking mechanism supported by the members 30 and 31 is adapted to move in a vertical plane about the axis of the pivot bolts 32 and 33. The latter are positioned at the rearmost portion of the whole mechanism in order that the discharge end of the picking mechanism, which is located close to this axis, will have a very small movement relative to the husking mechanism also located at the rear end of the mechanism and close to the axis mentioned.

Figure 2:
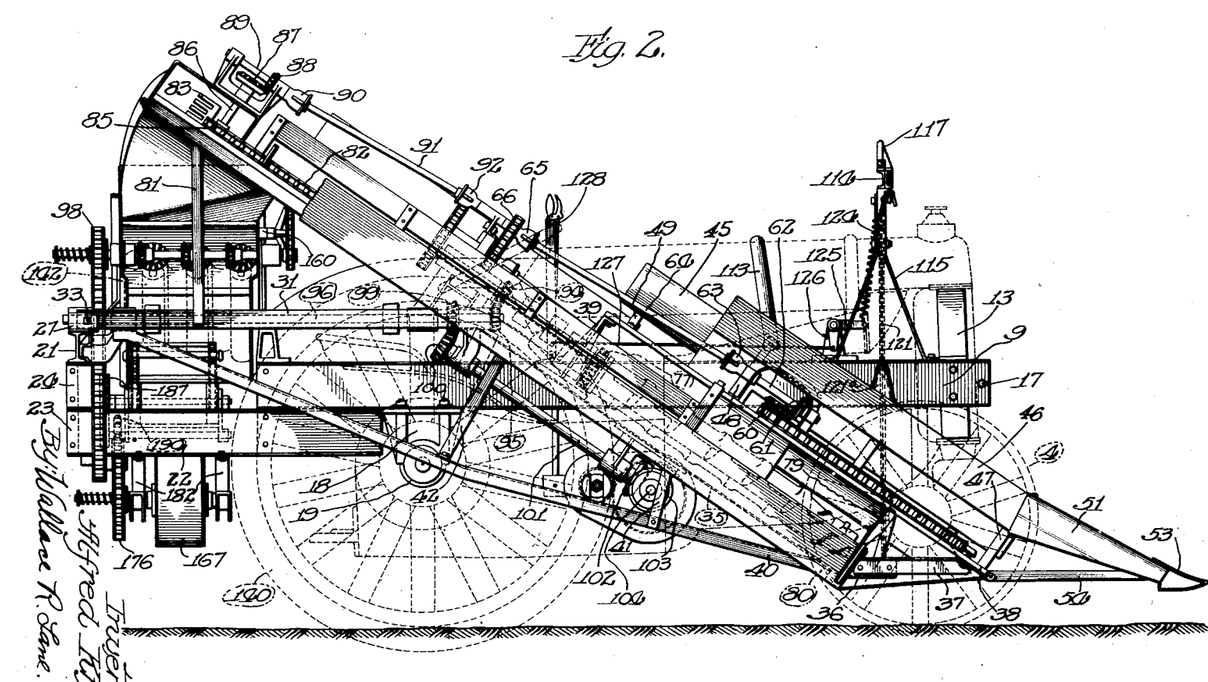
Fig. 2 is a side view in elevation of the same.

The supporting members 30 and 31 are in the form of angle bars and extend horizontally from the hinge feature thereof and then bend downwardly with inclined parts 34 and 35 (see Figs. 1 and 2) and terminating at their lower forward ends with a horizontal end part 36, shown in Fig. 2. To the latter are secured horizontal angle pieces 37 extending forwardly for attachment to supporting members 38, there being one on each side of the picking mechanism, and providing a space therebetween for the entry of the corn stalks as the machine proceeds over the ground. The members 38 may be in the form of planks or the like and have their upper ends secured to and supported by brackets 39 carried by the supporting members 30 and 31 on the inclined portions 34 and 35 thereof. These supporting members 30 and 31 may also be braced by brace bars 40 connected at their lower ends in any suitable way to the lower ends of the portions 34 and 35 and at their rear ends to the horizontal portion or end parts 28 and 29 of the members 30 and 31, as clearly shown in Fig. 2 of the drawings. Strut members 41 and 42 may be connected between the brace members 40 and the inclined portions 34 and 35 of the supporting members 30 and 31.

Upon the flat or plank members 38 on each side of the picking mechanism, are carried gathering chains 43 and 44 adapted to travel over sprockets, rotatably mounted on studs carried by the members 38. These chains are suitably covered by sheet metal guides or guards 45 and 46 suitably supported as by way of struts 47, 48 and 49 connected to the members 38. It will be noted that the guard 45 is somewhat longer than the guard 46 as also the gathering chain 43, as respects the gathering chain 44. At the forward lower ends of the guards 45 and 46 are pivotally connected shoes 50 and 51 having a certain amount of limited lateral or floating movement. The lower ends of the shoes have toe pieces 52 and 53 adapted to lightly hit the ground should the picker meet a rise or the like, and hence the picker may bound up to clear the rise. The shoes and toe pieces act to pick up and gather any down corn stalks or the like and the guards 45 and 46 act as guides for the corn stalks. The shoes are braced by suitable members 54 hinged to the forward ends of the members 38, (as shown in Fig. 2). The upper sprocket of the gathering chain 43 carries a bevel gear 55 which is in mesh with a pinion 56 driven by a shaft section 57 having a universal joint connection 58 with a shaft 59 extending upwardly and rearwardly as clearly shown in Fig. 1 of the drawings. Likewise the upper sprocket of the gathering chain 44 has a bevel gear 60 meshing with a pinion 61 connected to a shaft section 62 having a universal joint connection 63 with a shaft 64 which in turn has a universal joint connection 65 connected to a sprocket wheel 66 over which runs a chain 67 from a sprocket 68 connected to a universal joint connection 69 and the shaft 59. The sprocket 68 is also fixed to a shaft 70 extending upwardly and carrying a sprocket 71 operated by chain 72 driven by a sprocket 73 on the upper end of a shaft 74 leading to and being connected to one of a pair of snapping rolls 75, the latter being geared by way of a gear 76 in mesh with a similar gear 77 of a second snapping roll 78. The shafts and snapping rolls are mounted in the usual manner through the medium of suitable bearings connected to and supported by the supporting members 30 and 31 and the members 38. In this way it will be seen that by driving the shaft 74 power is transmitted to the snapping rolls and also to the gathering chains by way of transverse chains 72 and 67 respectively to the gathering chains 43 and 44. At one side of the member 31 is carried a conveyor mechanism, the lower end of which is supported by way of a bent bracket 79 having an end secured in any suitable way to the lower end portion 36 of the supporting member and having its other end connected to the lower end of the conveyor mechanism 80. The latter extends rearwardly and upwardly and is supported by means of a strut or the like 81 extending downwardly and connected to the cross member 31. See Fig. 2. Within the conveyor 30 operates a conveyor chain 82 carrying a number of comb-like conveyor members 83 and operative over suitable sprockets of which the lower sprocket 84 is pivoted on a stud connected to the floor of the lower end of the conveyor mechanism 80, and the upper sprocket 85 has a shaft 86 connected through beveled gears 87 and 88 to a shaft part 89 connected by a universal joint 90 to a shaft 91 in turn connected through a universal joint 92 to a shaft portion 93 carrying the sprocket 66 and also connected to the universal joint 65. It will be noted from this that the chain 67 operates through the sprocket 66 to drive the shaft 91 and also the shaft 86 and hence the chain 82 of the conveyor.

The shaft 74 which is connected with the snapping rolls carries a bevel pinion 94 which is in mesh with a bevel gear 95 secured to the end of a shaft 96 supported in a bearing bracket 97 connected to the members 30 and 31, and extending rearwardly and comprising shaft 96 with universal couplings and a sprocket to drive through a chain 98 to the husking mechanism at the rear of the frame. The forward extension of shaft 96 carries a bevel pinion 99 meshing with a gear 100 secured to the upper end of an inclined shaft 101 supported in suitable bearings fastened to the under side of the inclined parts 33 and 34 of members 30 and 31, as clearly shown in Fig. 2 of the drawings. The lower end of the shaft 101 carries a pinion 102 in mesh with a gear 103 connected to a transverse shaft 104 which connects through a universal joint 105 to a shaft 106 connected through a universal joint 107 to a gear in the housing 108. The gear in the housing 108 is adapted to be thrown into selective mesh with another gear therein operated by a shaft extending through the housing 109 which is located within the tractory body. The shaft in the housing 109 has a driven gear 110 driven by a gear 111 connected in any suitable manner with the power transmission means of the tractor and adapted to be driven thereby. The outer end of the shaft connected to the gear 110 may carry a pulley 112 for any general use. This constitutes a power take-off means driven from the gear 111 by way of the gear 110 through suitable gear mechanism carried in the housing 108 which is secured in any suitable manner to the sides of the tractor body. The drive then proceeds by way of the shaft 106 for flexible drive by reason of being connected with universal joints. This drives the shaft 104 which in turn drives through the bevel gears 102 and 103 by way of the shaft 101 to the gears 99 and 100 and hence the shaft 96. At this point the power branches so that the forward end of the shaft 96 transmits through the gear 95 to the gear 94 and hence operates the snapping rolls and also the sprocket 73, which is connected through a slip clutch of any suitable type, and further transmits power through the chain 72 to the sprocket 71 and hence the shaft 59 to the gathering chain 43. From the shaft to which is connected the sprocket 68 the power is transmitted through the chain 67 to the sprocket 66 connected to the shaft 64 which drives the gathering chain 44. The same sprocket 66 will also drive the shaft 91 by way of gears 88 and 87 to shaft 86 and hence the conveyor chain 82. It will be noted that the power take-off is direct from the side of the tractor and extends laterally into and through the corn picker mechanism and is flexible so that it may drive continuously irrespective of the vertical rise and fall of the picking mechanism which is hinged at the rear end about the pivots 32 and 33, as previously described.

The guards 45 and 46 for the gathering chains may be connected together and braced by a curved brace member 113.

Figure 4:
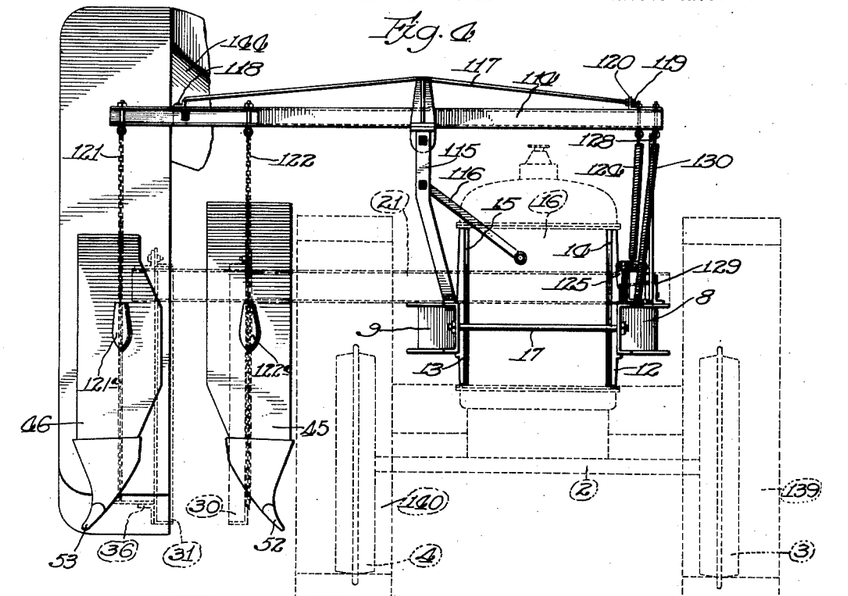
Fig. 4 is a front view in elevation showing more particularly the means for substantially supporting or counterbalancing the forward end of the picking mechanism.

In order that the forward end of the picking mechanism might be substantially counterbalanced, it is connected with counterbalancing means comprising a cross bar or beam 114 pivotally mounted intermediate its ends upon a supporting bracket 115 extending to and secured at its lower ends to the side member 9 of the frame surrounding the tractor. This supporting bracket 115 may be laterally braced by connecting elements 116 suitably connected to any part of the tractor, such as shown in Fig. 4. The beam 114 may be reinforced by a reinforcing rod 117 connected at one end by way of a bolt 118, and at the other end to an adjusting means 119 to an angle piece 120 secured to the other end of the beam. The beam 114 extends laterally from the tractor and over the corn picking mechanism and has connected to it a pair of depending chains 121 and 122 extending downwardly through hollow bosses 121a and 122a formed in the upper rolls of guards 46 and 45 and being respectively connected to the forwardly extending portions 36 of the frame members 30 and 31. At the other end of the beam 114 is connected a spring 124, the lower end of which extends downwardly to and is connected to a bell crank lever 125 pivotally supported upon a post 126 fastened to the side member 8. To another arm of the bell crank lever 125 is connected a rod 127 leading to a hand lever 128 adapted to cooperate with a notched quadrant 129. This hand lever 128 may be adjusted in any suitable position and locked in any selected notch of the quadrant for holding the bell crank lever and connected spring in such position that the forward end of the picking mechanism may be raised or lowered as desired. In other words, when the hand lever is operated in one direction, the tension of the spring 124 is reduced and the lever or beam 114 may then rock under the weight of the forward end of the picker so as to permit the latter to be lowered to the desired height above the ground and be capable of moving at such given height thereover as the machine proceeds over the ground. Another or opposite movement of the hand lever 128 will increase the tension of the spring 124 and cause the beam 114 to rock in an opposite direction so as to raise the forward end of the picking mechanism at any other given height above the ground. In addition to the spring 124 is also connected a similar spring 130 to one end of the beam 114 and also to the member 8 of the frame. This spring is of a tension for substantially counterbalancing the weight of the front end of the picking mechanism or substantially carrying the load thereof. It is preferable that it be slightly less than the weight of the front end of the picker so that the spring 124, when increased or decreased in tension, may respectively add or subtract to the load supporting force of the spring 130 so as to raise or lower the front end of the picker.

At the rear of the tractor and upon the rear end of the frame surrounding it, is supported, in any suitable manner, a husking device having side pieces or walls 131 and 132 secured in any suitable manner to supporting brackets or the like 133, which may be secured in any suitable manner to rear cross members of the frame. On the opposite side of the husking device, cross member 136 is secured to the side members 8 and 9 and adapted to support fenders 137 and 138 for the tractor propelling wheels 139 and 140.

The husking mechanism comprises a number of pairs of rolls of the usual construction, which are driven through gearing mechanism operatively connected to the sprocket wheel 143 driven by the chain 98. The upper end of the husking mechanism is open and located to receive picked ears of corn from a chute 144 carried by the upper end of the conveyor mechanism of the corn picking mechanism. The rolls of the husking mechanism are inclined so that the ears may move downwardly while the rolls operate upon the husks thereof to strip the same from the ears.

Figure 3:
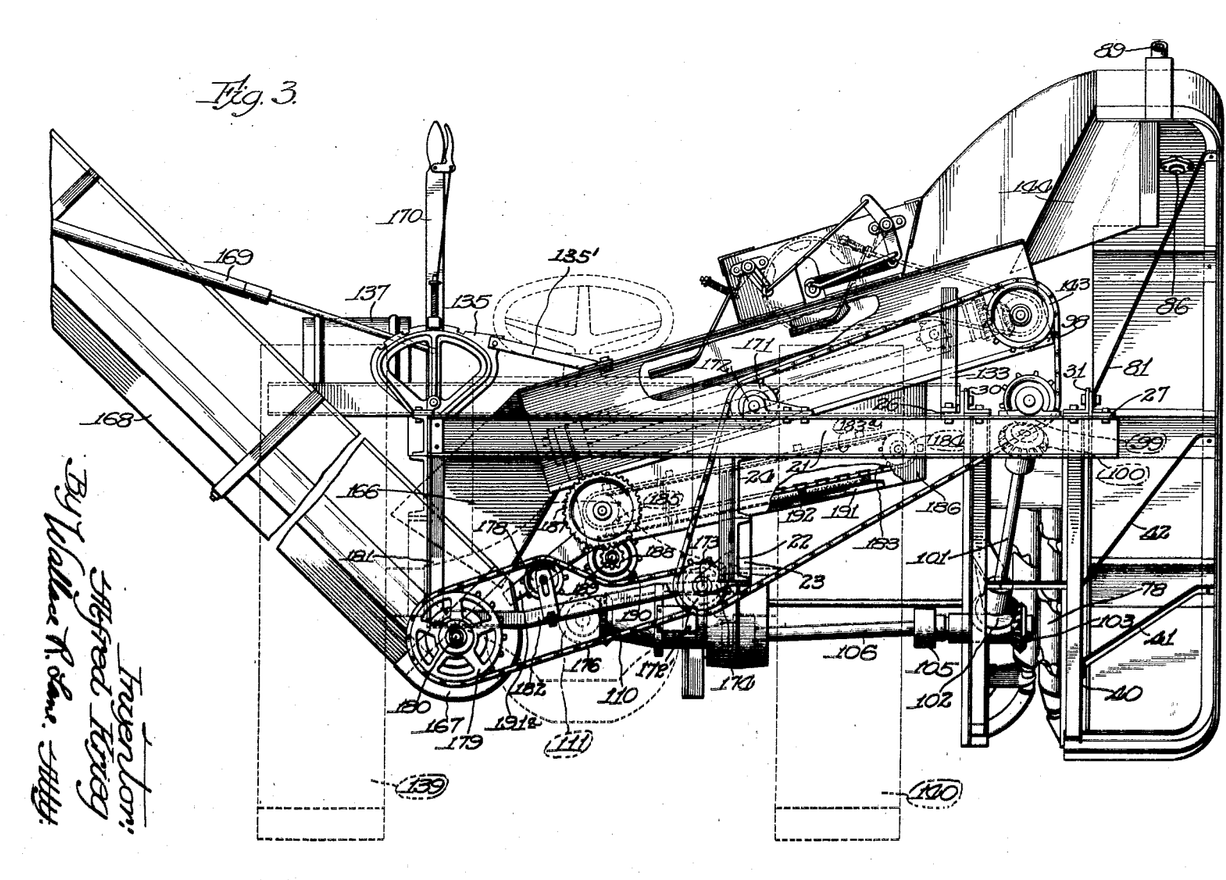
Fig. 3 is a rear view in elevation of the same, with parts broken away to show interior structure.

Above the husking rolls is provided a means for positioning and retarding the unhusked ears of corn of any suitable construction and as shown in Fig. 3 of the drawings. The ears after having the husks removed will slide or move downwardly and fall through a chute 166 into a conveyor hopper 167 in which operates a conveyor of any suitable type for carrying the ears upwardly to the upper end of the same for discharging the ears into a receiving or collecting receptacle such as a wagon or cart or a bin on the frame, which will be later explained. The conveyor is generally designated with a reference character 168 and is capable of being swung to a greater or less inclination and held in swung position by a reach rod 169 leading to a handle or lever 170 cooperating with the quadrant 135 which is notched at different points whereby when the handle 170 is swung to the selective notch thereof, the conveyor 168 may be held in greater or less inclined position. The quadrant may be braced by links 135' connected to the members 131 and 132.

In order to operate the conveyor 168, the driving chain 98 passes over an idler sprocket 171 supported in a bearing 172 carried by the transverse member 21 and proceeds to a sprocket wheel 172' connected to a shaft 173 supported in a bearing 174 secured to the rear end portion 23 of member 22. The shaft 173 then drives another sprocket to operate a chain 176 passing over an idler sprocket 178 and to the conveyor sprocket 179 operating through a shaft 180 extending into the hopper 167 and adapted to operate the endless conveyor chain in the conveyor casing 168. The hopper 167 may be suitably supported by hangers 181 secured to the frame side member 8. It may also be suitably braced by bracing member 182 extending and secured to the member 22.

When the husks are removed, they are discharged from under the rolls upon an endless conveyor 183 passing over suitable sprockets and rollers 184 and 185 rotatably carried by shafts mounted in side walls of housing 186 beneath the husking housing. The shaft of the sprocket 185 is driven by a gear 187 which is in turn driven by a gear 188 connected to a shaft 189 operated by a sprocket 190 operatively engaged with an upper part of the chain 176, as clearly shown in Fig. 3. Beneath the endless conveyor or carrier 183 is disposed a board 191 in inclined position and adapted to receive thereon kernels of corn that may have been detached and carried with the husks to the endless conveyor apron 183. As the husks fall upon the latter, the kernels will become detached and fall through the conveyor 183. The kernels of corn may then move downwardly over the board 191 and be discharged by way of a chute 191a into the hopper 167. In order to aid the feed of these kernels from the board to the hopper, the conveyor 183 may have transverse slats 192 adapted to pass over and scrape the surface of the board to cause the kernels to move downwardly to the lower end thereof and be discharged into the receiving hopper 167. The husks are carried by the upper portion of the endless conveyor 183 and are discharged from the upper end thereof to fall beneath the machine upon the ground. Beneath the upper portion of the conveyor 183 is a screen or grid 183a over which the husks are scraped, by the slats 192 and through which the kernels of corn may drop onto the feed board 191.

Figure 5:
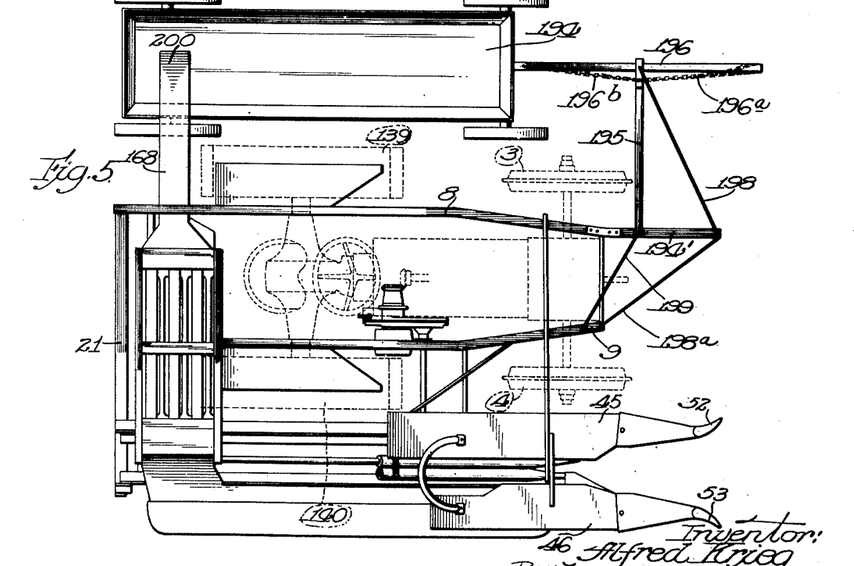
Fig. 5 is a top plan view of a harvester in connection with a wagon or cart used as a collecting or receiving means for the husked grain.

The device may also have a receiving or collecting means such as the cart or wagon 194 adapted to be drawn along with the tractor and the harvester and receive the harvested material or grain while traveling therewith. For this purpose the member 8 of the frame is provided with an extension 194' to which is connected a laterally extending draft member 195 capable of being connected at its outer end adjustably to a wagon tongue 196, the latter carrying chains or the like 196a and 196b connected to the forward and rear ends of the tongue and to the draft member 195. The latter may be suitably braced by a bracing rod 198 connected to the outer end of the member 195 and also to the outer end of the extension 194. Further bracing may be provided by the connection of a rod 199 to the inner end of the draft member 195 and to the forward end of the side member 9 of the frame, and also a brace member 198a connected to the outer end of the extension 194 and to the forward end of the side member 9, all as clearly shown in Fig. 5 of the drawings. The cart or wagon may be connected to the draft member 195 in such a position that the body of the wagon may be located beneath the discharge spout 200 of the conveyor 168. When the wagon is filled with grain, it may be detached from the draft member 195 and another connected in place to take its place, and the harvesting continued.

Figure 6:
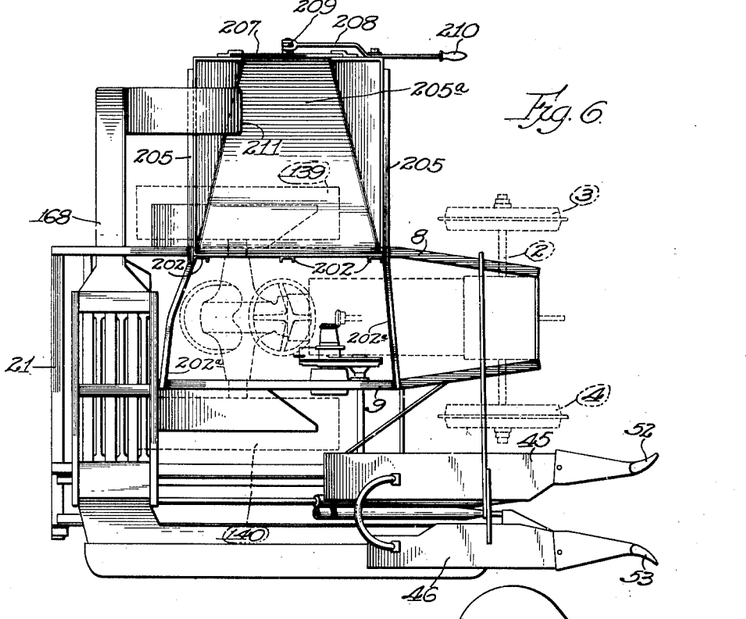
Fig. 6 is a top plan view of another or alternative form of harvester with a bin or tank mounted upon the frame for collecting or receiving the husked grain.
Figure 7:
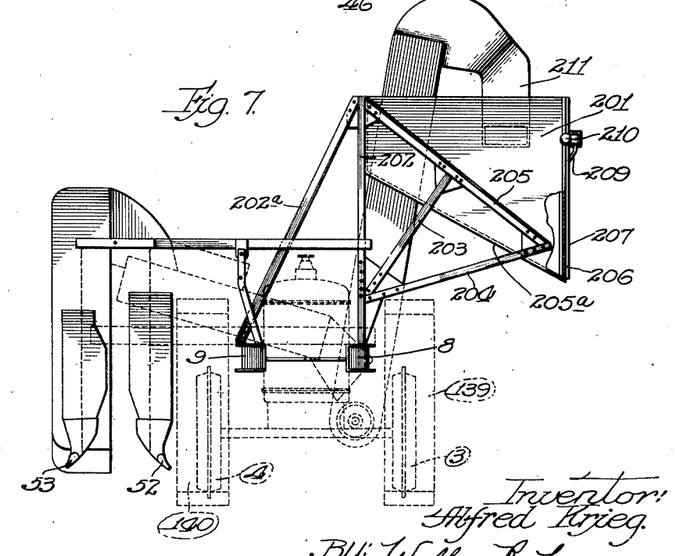

An alternative form of collecting means may be provided such as a bin 201 suitably supported upon the frame member 8 such as by way of uprights 202 resting thereon and having laterally extending bracing or supporting members 203 and 204 connected to a side member 205 at each end of the bin 201 and also bracing members 202a connected by way of gussets to the upper ends of uprights 202 and to the said frame member 9. The bin has preferably an inclined floor 205a leading to a door 206 controlled by a slide gate 207 which may be operated by a hand lever 208 connected by a link 209 with the slide gate 207 for raising and lowering the same, the other end of the lever having a handle 210 for the manual operation thereof as desired. When the bin is full of material, a wagon or cart may be drawn up to the discharge of the tank and the driver of the wagon operates the hand lever 208, 210 so as to cause the material to be discharged from the bin into the cart or wagon.

The bin 201 is preferably located at the side of the tractor opposite from that of the corn picking mechanism and supported permanently in place either over the wheels or between the same. The conveyor from the husking mechanism preferably extends forwardly and over the bin to have a discharge spout 211 for discharging the material into the upper part of the bin.

While I have herein described and upon the drawings shown a few illustrative embodiments of the invention and features thereof, it is to be understood that the invention is not limited thereto but may comprehend other constructions, details, arrangements of parts and features without departing from the spirit thereof.

Having thus disclosed the invention, I claim:

1. An agricultural device, comprising a frame adapted to fit about a tractor, means for connecting the frame to the tractor for movement therewith, means for pivotally connecting a harvesting mechanism at a point adjacent the rearmost end of said frame whereby the harvesting mechanism may move in a vertical plane, means associated with the frame for substantially supporting the forward end of the harvesting mechanism, said last mentioned means comprising a support on said frame, means movably carried by the support and connected to the forward end of the harvesting mechanism, resilient means connected to said movably carried means for substantially counterbalancing the weight of the forward end of said harvesting mechanism, and means for manually adjusting the force of said resilient means for lowering or lifting the forward end of said harvesting mechanism.

2. An agricultural device, comprising a frame adapted to fit about a tractor, means for connecting the frame to the tractor for movement therewith, means for supporting a harvesting mechanism from said frame and at one side of the tractor, and means for directly connecting a receiving receptacle to said first named frame at the other side of the tractor.

3. An agricultural device adapted to harvest corn and the like, comprising a frame adapted to fit about a tractor, means for connecting the frame to the tractor for movement therewith, means for supporting a harvesting mechanism from said frame and at one side of the tractor, means for directly connecting a receiving receptacle to said frame at the other side of the tractor, and husking means carried by the frame and operative to receive unhusked grain from the harvesting mechanism, and means for delivering the husked grain to said receptacle.

4. An agricultural device, comprising a frame adapted to fit about a tractor, means for connecting the frame to the tractor for movement therewith, means for supporting a harvesting mechanism from said frame and at one side of the tractor, means for directly connecting a receiving receptacle to said frame at the other side of the tractor, and a power take-off means operatively connected to the operating means of the tractor and extending laterally therefrom for operative engagement with the operating means of the harvesting mechanism.

5. An agricultural device, comprising a frame adapted to fit about a tractor, means for connecting the frame to the tractor for movement therewith, means for supporting a harvesting mechanism from said frame and at one side of the tractor, means for directly connecting a receiving receptacle to said frame to the other side of the tractor, and a power take-off means operatively connected to the operating means of the tractor and extending laterally therefrom for operative engagement with the operating means of the harvesting mechanism, said power take-off means being flexible for accommodation to the vertical movement of the harvesting mechanism.

6. A tractor in combination with a harvesting mechanism having snapping rolls, gathering chains, a conveyor and a husker adapted for association with the tractor, a frame for said harvester, an inclined shaft carried by said frame, a power take-off means from the tractor and operatively connected to the lower end of said shaft, a drive member operatively connected to the upper end of said shaft and adapted to operate the husker at one end thereof, means connected to the other end of said drive member for operating said chains, rolls and conveyor.

7. A tractor in combination with a harvesting device having harvesting and husking mechanisms and adapted to be associated with the tractor, a power take-off leading directly from the operating means on the tractor and laterally therefrom to the harvesting mechanism, a shaft in the latter and driven by said power take-off, a second shaft driven by said first shaft, said second shaft having a portion extending to and adapted to operate said husking mechanism, and having another portion operatively connected to and adapted to operate the operating parts of said harvesting mechanism.

In witness whereof, I hereunto subscribe my name to this specification.

ALFRED KRIEG.